(12) United States Patent
Gould et al.

(10) Patent No.: US 7,501,140 B2
(45) Date of Patent: Mar. 10, 2009

(54) METHOD FOR PROCESSING MEAT SLABS

(75) Inventors: Bruce M. Gould, Industry, CA (US); Jeffrey K. Arnswald, Stilwell, KS (US); Christopher O. Norman, Grand View, MO (US)

(73) Assignee: Challenge-RMF, Inc., Grandview, MO (US)

( * ) Notice: Subject to any disclaimer, the term of this patent is extended or adjusted under 35 U.S.C. 154(b) by 889 days.

(21) Appl. No.: 10/294,946

(22) Filed: Nov. 14, 2002

(65) Prior Publication Data

US 2004/0096555 A1 May 20, 2004

(51) Int. Cl.
*A23P 1/10* (2006.01)
*A22C 7/00* (2006.01)

(52) U.S. Cl. ............... 426/513; 426/524; 426/640; 425/517; 425/112; 100/92; 100/910; 99/352

(58) Field of Classification Search ............ 426/641, 426/513, 645, 524; 99/352; 100/92, 94, 100/910; 425/517, 112
See application file for complete search history.

(56) References Cited

U.S. PATENT DOCUMENTS

| 75,965 | A | * | 3/1868 | Perry | 452/42 |
|---|---|---|---|---|---|
| 1,767,054 | A | * | 6/1930 | Briggs | 426/315 |
| 1,779,546 | A | * | 10/1930 | Jordan | 426/513 |
| 2,176,149 | A | * | 10/1939 | Redfern et al. | 269/54.2 |
| 2,228,644 | A | * | 1/1941 | Sackas | 425/318 |
| 2,255,796 | A | * | 9/1941 | Linane et al. | 426/513 |
| 2,696,442 | A | * | 12/1954 | Allbright | 426/513 |
| 2,733,153 | A | * | 1/1956 | Hammerberg | 426/513 |
| 3,638,554 | A | * | 2/1972 | Ackroyd | 426/407 |
| 4,036,997 | A | * | 7/1977 | VerBurg | 426/272 |
| 4,072,763 | A | * | 2/1978 | Mart | 426/513 |
| 4,517,888 | A | | 5/1985 | Gould | 99/472 |
| 4,574,087 | A | * | 3/1986 | Sheehy et al. | 426/129 |
| 4,657,771 | A | | 4/1987 | Gould | 426/641 |
| 4,680,183 | A | * | 7/1987 | van Schouwenburg | 426/64 |
| 4,717,574 | A | * | 1/1988 | Liesenfeld et al. | 426/315 |

\* cited by examiner

*Primary Examiner*—Carolyn A Paden
(74) *Attorney, Agent, or Firm*—Connolly Bove Lodge & Hutz LLP

(57) ABSTRACT

An apparatus and method for processing meat slabs into meat strips, particularly pork belly slabs into bacon strips. The apparatus includes a massager, a slab press station, a sleeve for holding the pressed slab, an oven or smokehouse, a blast chiller, a slab removable device and a spiral freezer. The method for processing the meat slab into meat strips includes massaging the slab, pressing the slabs and inserting the slabs into sleeves in the pressed condition. The sleeves are then transported to an oven for cooking and then a blast chiller. Once chilled, the slabs are removed from the sleeve and sliced to the appropriate thickness.

41 Claims, 7 Drawing Sheets

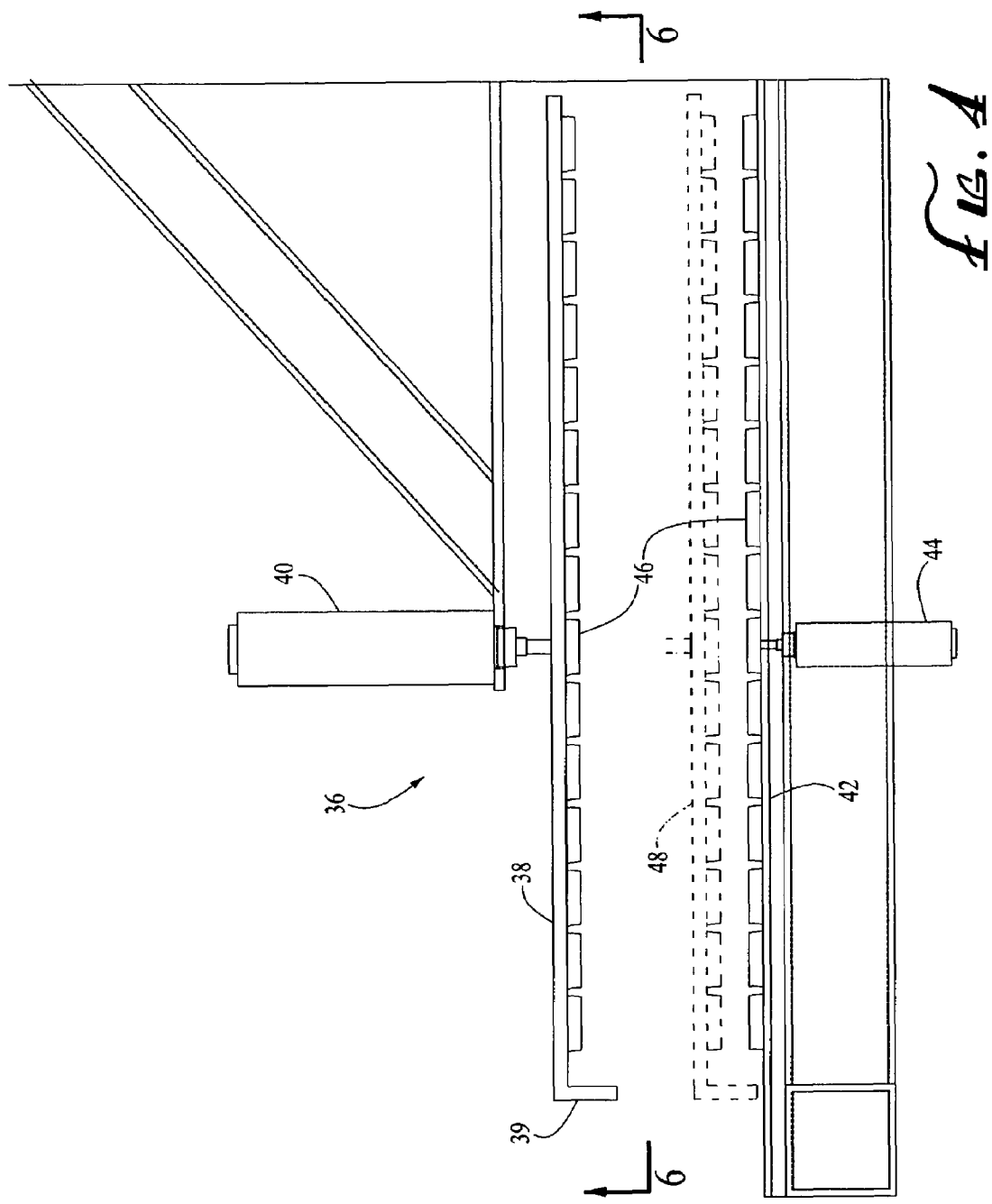

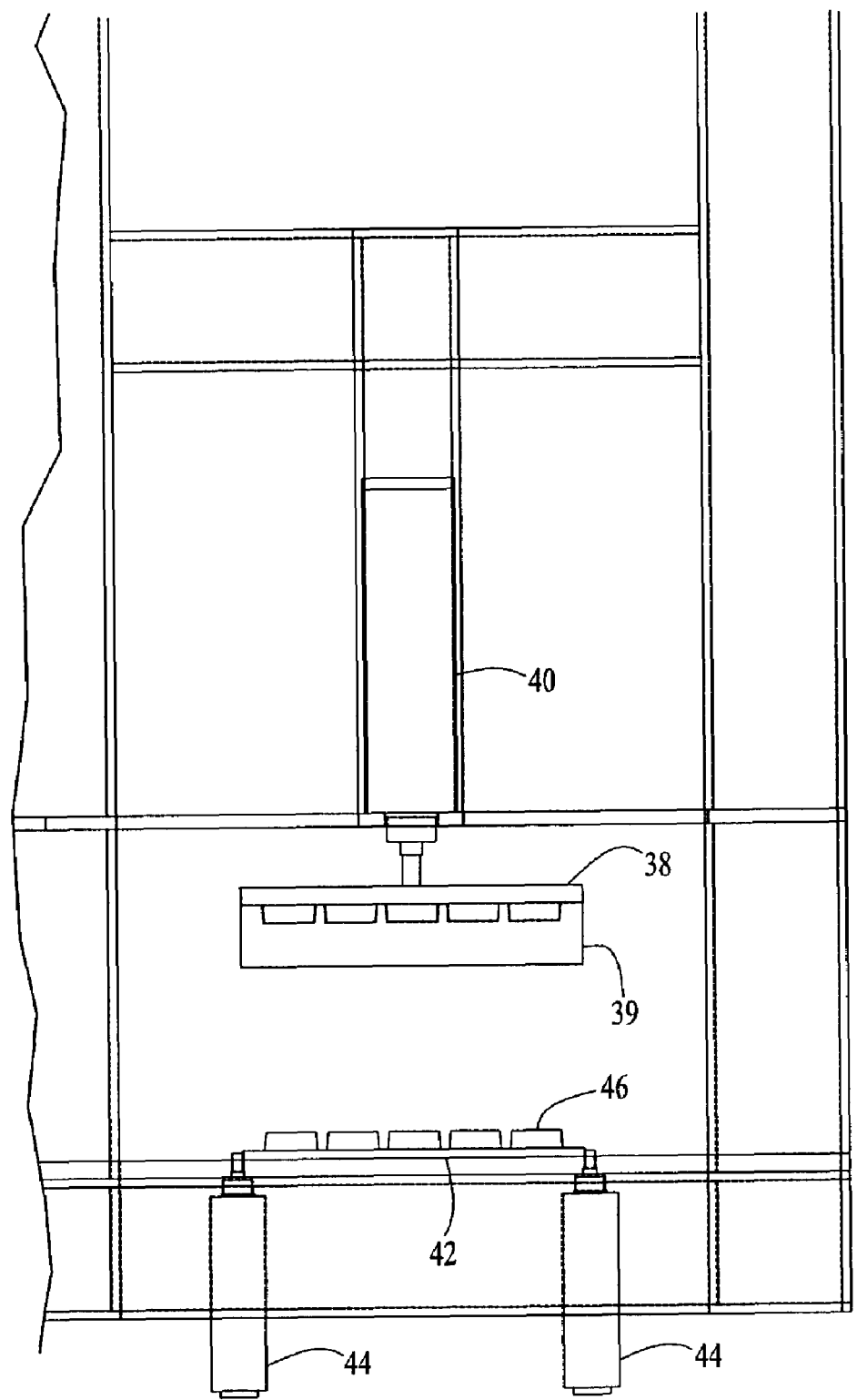

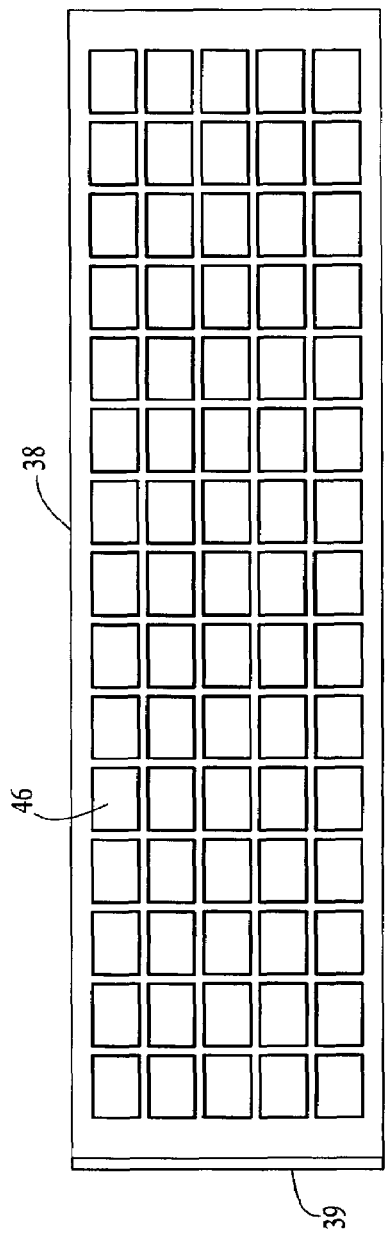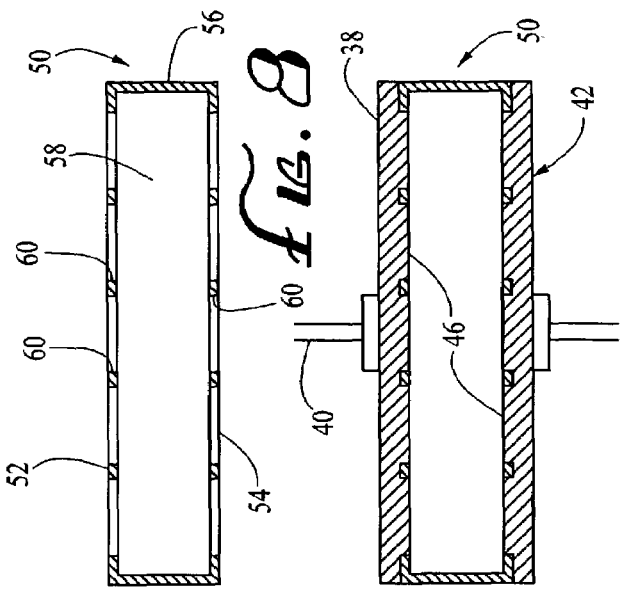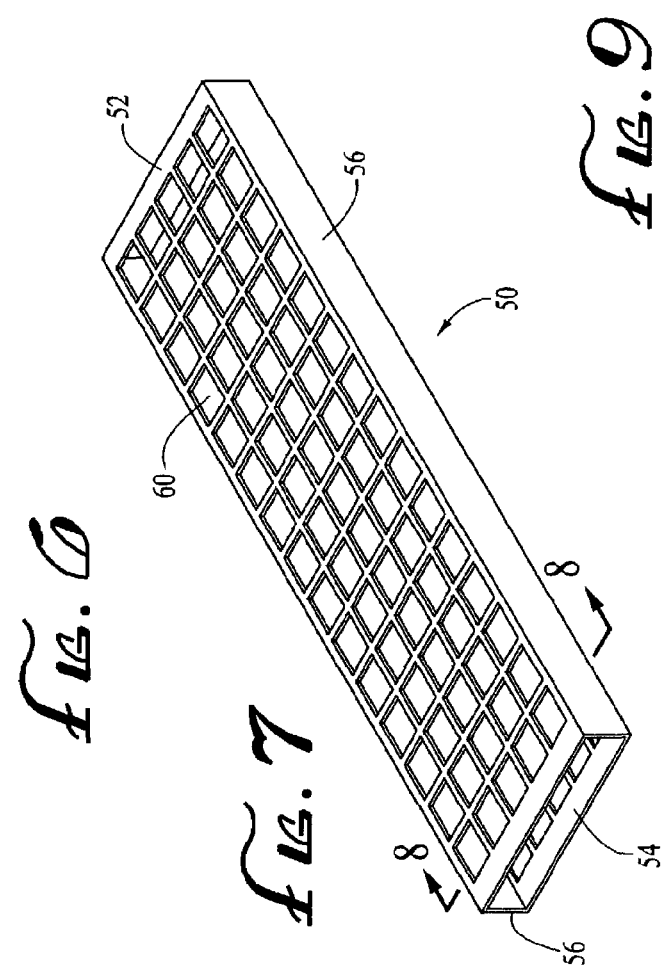

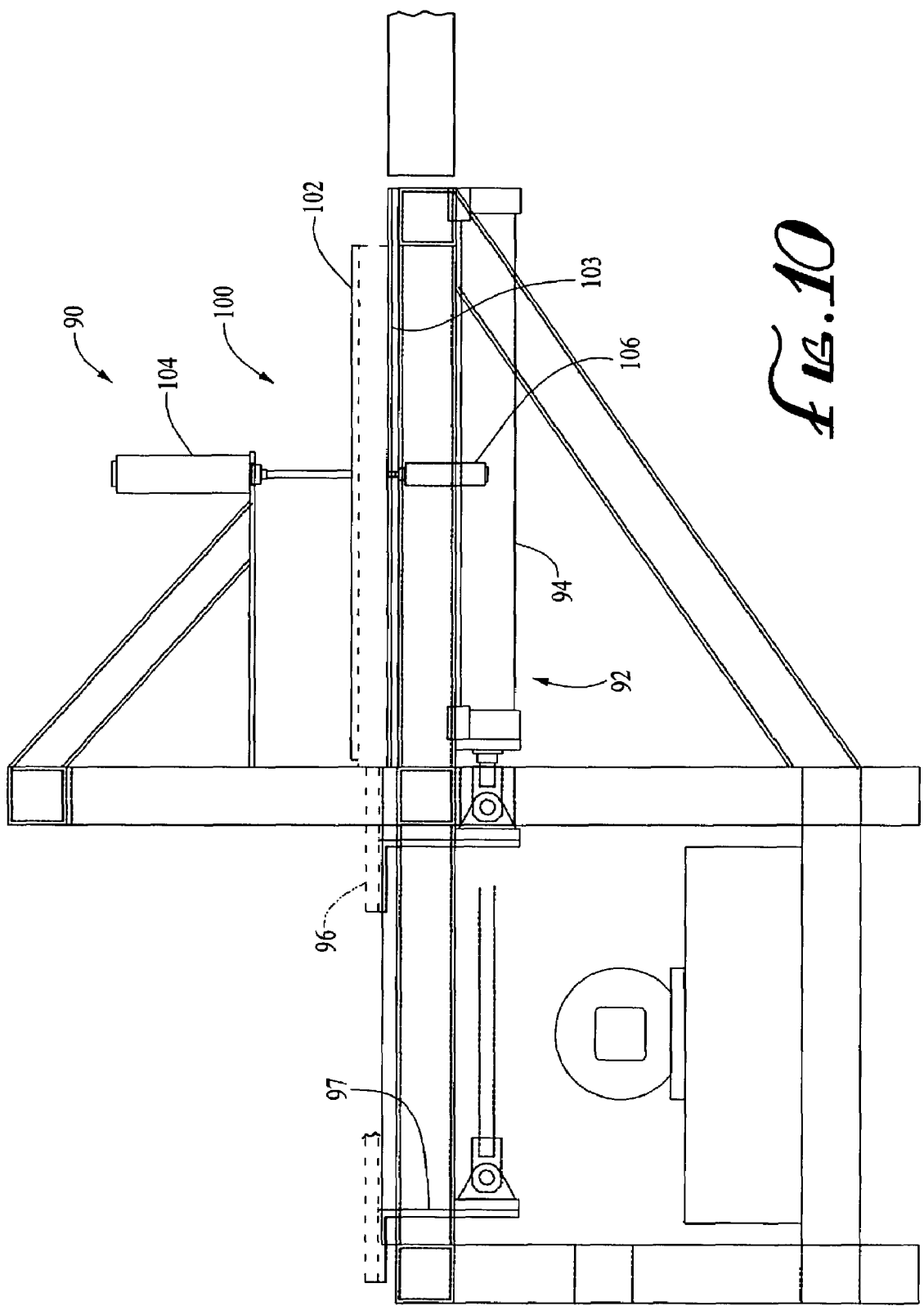

METHOD FOR PROCESSING MEAT SLABS

BACKGROUND OF THE INVENTION

The field of the present invention is meat processing.

The conventional method of processing meat slabs or bellies, and in particular pork bellies into bacon strips, consists of several steps. First, the bellies, which can either be fresh or defrosted, are injected with approximately 11% to 13% pickle solution. Once the bellies are injected with the pickle solution, they are hung from a smokehouse tree with a hanging device or comb. The bellies are then either cooked or smoked to approximately 128° F.

Once the bellies have been cooked sufficiently, they are removed from the smokehouse and placed in a blast chiller. The bellies are tempered in a blast chiller to a uniform temperature of approximately 18° F. to 27° F.

After the bellies are chilled, the bellies are then shaped in a pressing device. The pressing of the bellies results in bellies with parallel sides and substantially squared ends. The pressed bellies are then sliced to a desired thickness. Because the belly is enclosed on all sides when the belly is pressed, the belly is prevented from stretching as it is pressed vertically, resulting in lower slice yields. The average finished slicing yield ranges from 65% to 85% of the bellies. The 15% to 35% yield loss stems from various sources, such as internal separation of fat and lean caused by the pressing process, which results in an unacceptable slice, from uneven ends and pieces left in the slicing, and from trimming the bellies at various stages to enhance the rectangular shape.

In recent years, several companies have developed devices that press the bellies in all directions to form a nearly perfect rectangular shape. These devices press the bellies at a temperature of approximately 18° F. to 27° F. At this temperature, however, the pressure applied while pressing often causes internal shearing of the tissues that connect the fat to the lean, which results in significant damage to the individual slices. Further, because the bellies are compressed in all directions and are not allowed to stretch, slicing yields are lower. Finished slicing yields are typically in the 65% to 85% range.

More recently, the process has been modified by some companies to include massaging of the bellies, trimming the bellies to the rectangular shape and placing the massaged and trimmed bellies into stainless steel cages. The process includes injecting fresh or defrosted bellies with a pickle solution as in the conventional process. The injected bellies are then massaged within a temperature range of approximately 34° F. to 38° F. The massaged bellies are then placed into a vat or onto a staging conveyor for transporting to a worktable. On the worktable, the bellies are selected for their appropriate size and each belly is manually wrapped in a permeable film. The permeable film is between 4-6 mils in thickness.

Once the belly has been wrapped in the permeable film, it is manually stuffed into a cage and the lid is closed. The lid, as it closes, compresses the surface of the belly to insure, as much as possible, that the shape of the belly will have six flat surfaces comprised of three pair of parallel surfaces. The permeable film wrapped around the belly prevents the belly from extruding through the cage perforations, and also prevents the belly from sticking to the stainless steel cage during the cooking cycle.

Once stuffed into the cage, the belly is hung vertically on a tree and moved into a smokehouse/oven for cooking and smoking. The permeable film allows the smoke to penetrate the belly, giving it flavor and color. Once cooked, the belly is then chilled. The belly is then removed from the cage and the permeable film is removed from the belly and discarded.

The belly is then taken to a blast freezer to temper the belly to a uniform temperature of approximately 18° F. to 27° F. Once the belly has reached the desired temperature, the belly is sliced and packaged for retail sale or food service. This process typically produces substantially rectangular shaped bellies and slices, and produces yields often exceeding 90%.

The key to the success of any molded bacon process is the ability to press bellies into a substantially rectangular shape while maintaining a high slicing yield from the belly. Pressing bellies at a temperature above freezing, while advantageous, is problematic because the bellies do not retain their pressed shape. Prior art methods have typically only pressed bellies while frozen so that they retain their pressed shape.

The most conventional method is one such method. It requires pressing of bellies that are crust frozen and tempered to a temperature range of approximately 18° F. to 27° F., to permit the bellies to retain their final pressed shape. However, because the bellies are frozen during the pressing process, it is more likely that the belly will sustain shearing of connective tissues. This results in a greatly reduced slicing yield from the belly.

The caged belly process, although producing higher yields than the more conventional method is slow and labor intensive. The bellies must be manually wrapped in the permeable film and unwrapped after cooking/smoking, which is time consuming and expensive. Additionally, the process involves significant operating costs associated with the permeable film and the constant repair and replacement of the stainless steel cages.

Thus, there is a need for an improved method and apparatus for processing meat bellies which produces high yields and is fast, efficient and has a low cost.

SUMMARY OF THE INVENTION

The present invention is directed to a process for the forming of meat slabs. A meat slab is placed in a cavity and pressed to be formed to a predetermined thickness. The formed slab is discharged from the cavity into a sleeve for subsequent processing.

In a first separate aspect of the present invention, the formed slab is pressed by a platen while being discharged through pushing of the slab from the cavity into a sleeve. The cavity has parallel sidewalls and a base between the walls to form the cavity with the platen pressing the slab in the cavity. The slab is allowed to expand at what will be the end first entering the sleeve as it is being pressed. This process provides for a high volumetric recovery of product in a formed state.

In a second separate aspect of the present invention, the formed slab is pressed by a platen while being discharged through pushing of the slab from the cavity into a sleeve. The slab is allowed to expand at what will be the end first entering the sleeve as it is being pressed. Once in the sleeve, the slab is chilled to at least a crust frozen condition and removed from the sleeve. Again, high volumetric recovery of product in a formed state is provided.

In a third separate aspect of the present invention, the formed slab is pressed by a platen while being discharged through pushing of the slab from the cavity into a sleeve. The sleeve has an upper and a lower surface both having a pattern of apertures for treatment through the sleeve.

Other and further aspects and features of the invention will be evident from reading the following detailed description of the method shown in the drawings, which is intended to illustrate, but not limit, the invention.

BRIEF DESCRIPTION OF THE DRAWINGS

The drawings illustrate the design and utility of preferred embodiments of the present invention, in which similar elements are referred to by common reference numerals.

FIG. 4 is a partial side elevational view of the stripper plate press apparatus of the present invention;

FIG. 5 is a partial end elevational view of the stripper plate press apparatus shown in FIG. 4;

FIG. 6 is a sectional view of the upper stripper plate taken along line 6-6 in FIG. 4;

FIG. 7 is an isometric view of the sleeve for holding the pressed meat slabs;

FIG. 8 is a sectional view of the sleeve for holding the pressed meat slabs taken along line 8-8 in FIG. 7;

FIG. 9 is a sectional view of the sleeve for holding the pressed meat slabs with the stripper plates in the pressed position; and FIG. 10 is a partial side elevational view of the discharge apparatus for discharging the slabs from the sleeve.

DETAILED DESCRIPTION OF THE PREFERRED EMBODIMENTS

Figure 1:
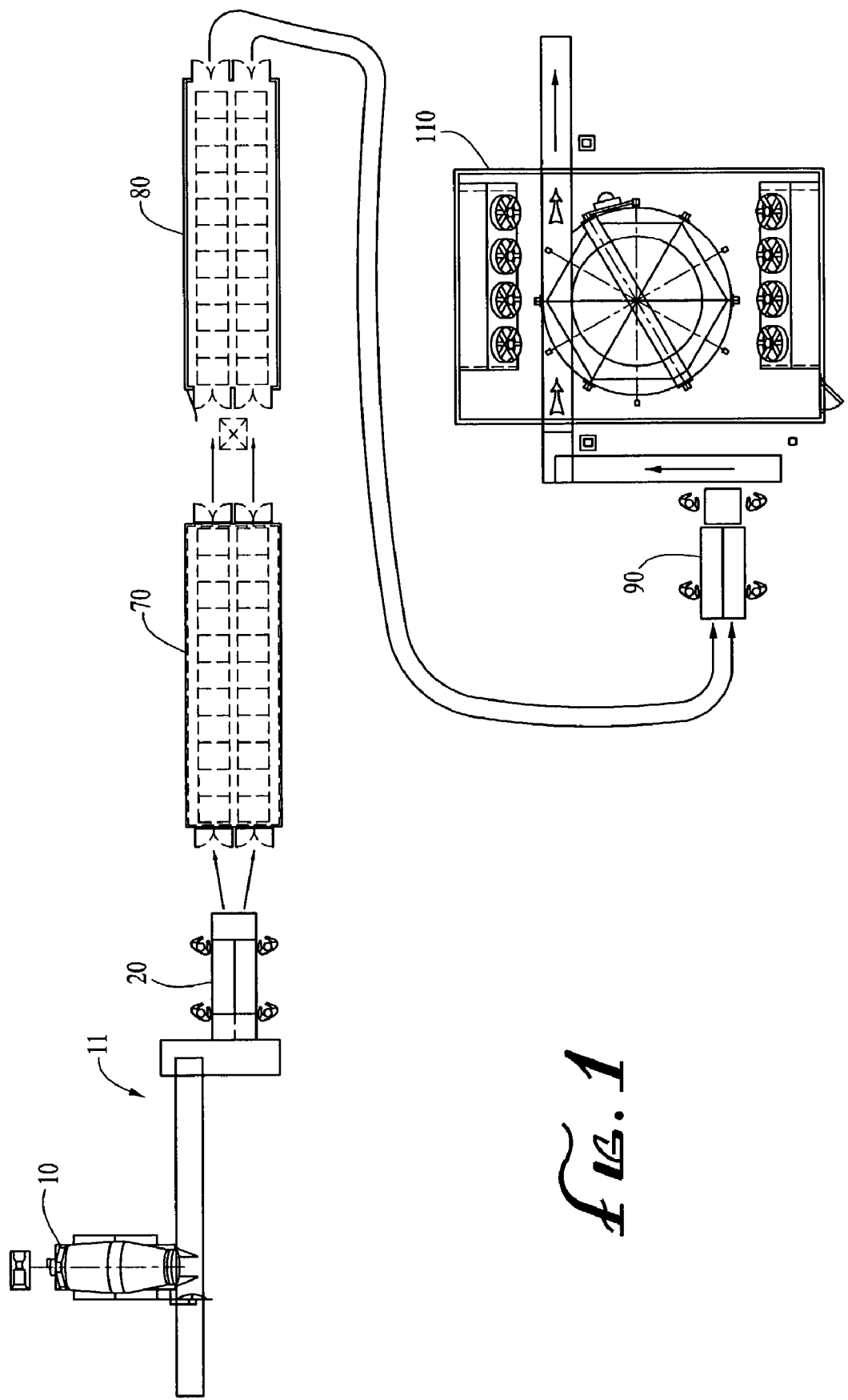
FIG. 1 is a schematic plan view diagram of the apparatus and method of the present invention for processing meat slabs.

The apparatus for processing meat slabs includes a massager 10, a press 20, a smokehouse or oven 70, a blast chiller 80, a slab removal device 90, and a spiral freezer 110, as shown in FIG. 1. The drawings illustrate a dual, side-by-side processing line system but a single or multiple lines may be employed. The processing system may also include conventional slicing and packaging stations (not shown). Although the method and apparatus of the present invention for processing meat slabs will generally be described in connection with processing pork bellies into bacon strips, the method and apparatus may be used to process any other type of meat pieces into meat strips or slices and, for convenience of description and claiming, all such meat pieces have been referred to above and hereinafter shall be referred to as a "slab", "slabs", "meat slab" and "meat slabs".

The massager 10 is preferably a food processor as described in U.S. Pat. Nos. 4,657,771 and 4,517,888, hereby incorporated by reference as though set forth in full. The food processors of those patents massage the slabs in a temperature-controlled drum into which brine is added for absorption by the slabs. The massager 10, however, may be any other appropriate means for massaging, rubbing and/or conditioning the slabs prior to their pressing.

Figure 2:
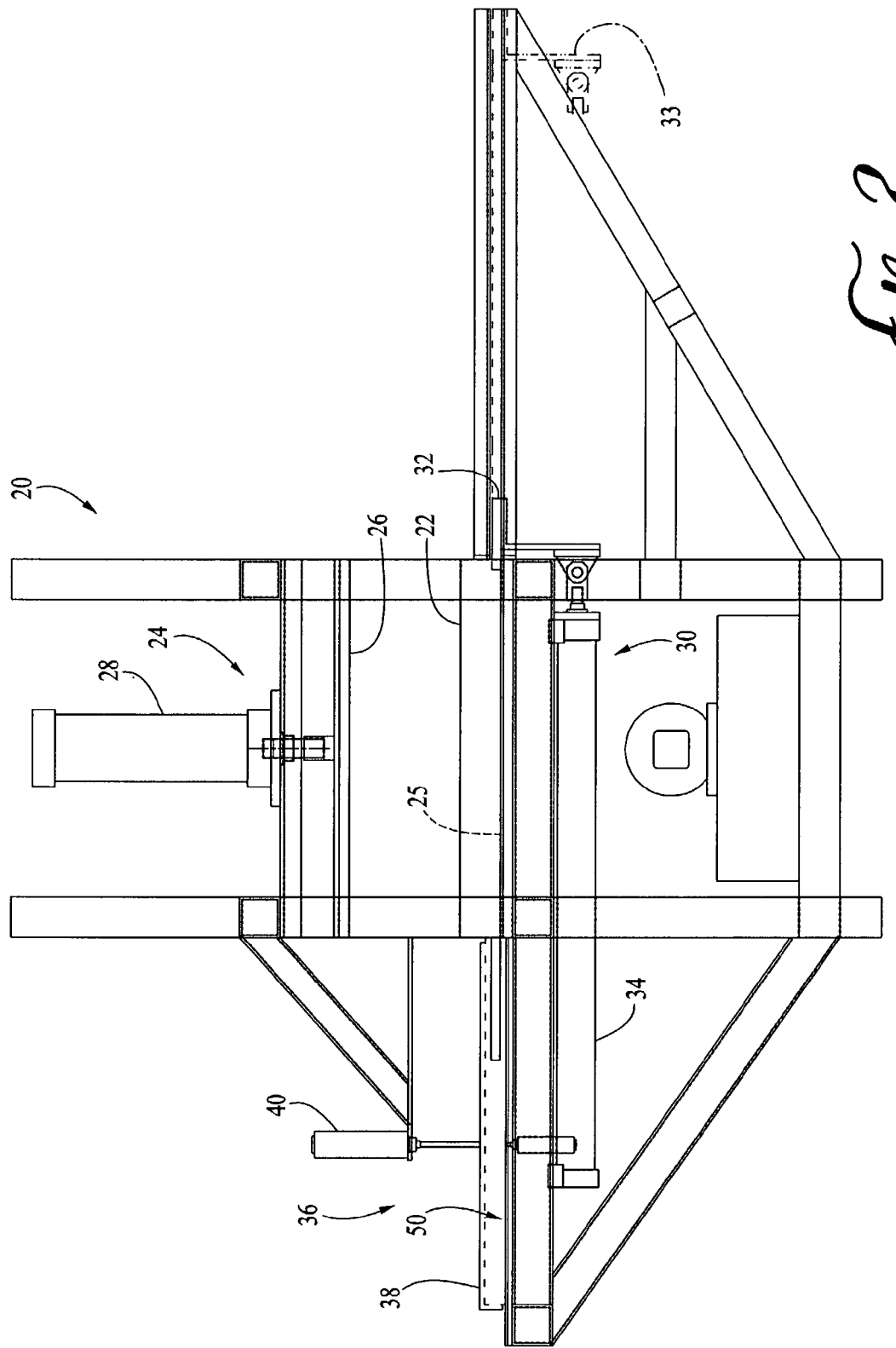
FIG. 2 is a side elevational view of the meat slab press and stuffing apparatus of the present invention.
Figure 3:
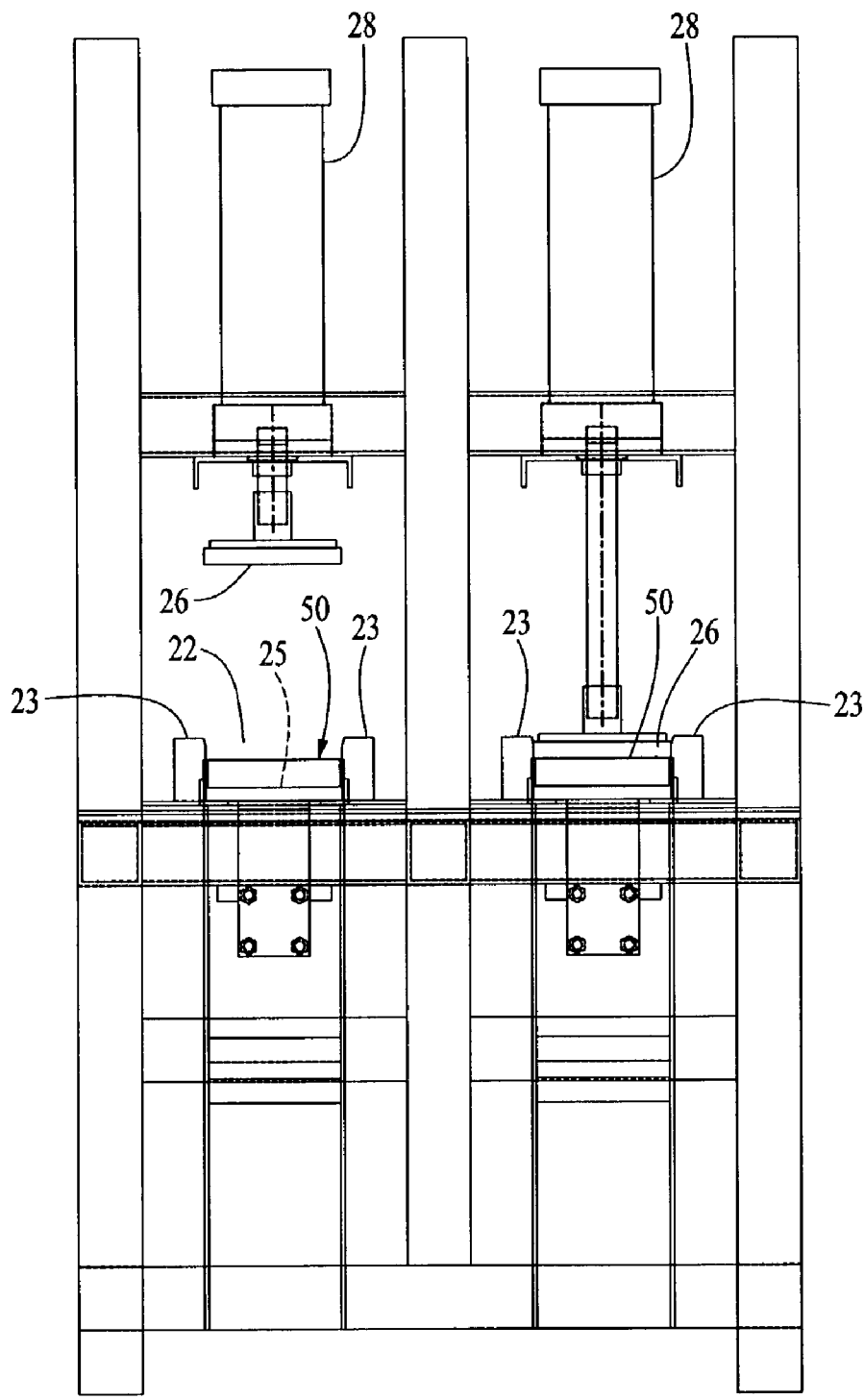
FIG. 3 is an end elevational view of the slab press and stuffing apparatus shown in FIG. 2.

The press station 20, as shown in FIGS. 2 and 3, has two identical processing lines and each line includes a cavity 22, a slab press 24, a ram device 30 and a stripper plate press 36. The cavity 22 is preferably rectangular having vertical sides 23, a flat bottom 25 and open ends. The preferably width of the rectangular cavity is substantially equal to the desired length of a finished bacon strip, which varies between approximately 8¾ inches and 10½ inches.

The length of the rectangular cavity 22 is sized to accommodate the length of the pressed belly. Because the ends of the cavity 22 are open, the belly is free to elongate or stretch while it is being pressed vertically. Preferably, the belly elongates at least 4 inches and up to 12 inches or more during pressing.

The slab press 24 includes a flat, rigid platen 26 connected to a hydraulic cylinder 28. The hydraulic cylinder 28 forces the flat platen 26 down into the top of the rectangular cavity 22. As an alternative to the single hydraulic cylinder 28, any combination of hydraulic cylinders or other mechanical drives may be used to obtain the required pressing force (discussed below), such as four cylinders positioned below the cavity 22 at the four corners to pull downwardly on platen 26 or the like. The shape of the flat platen 26 is preferably rectangular and sized to form a tight fit with the sides 23 of the cavity 22. This tight fit between the flat platen 26 and cavity 22 prevents the slab from escaping from the cavity 22. Once the slab has been placed in the cavity 22, the plate 26 is lowered to compress the slab to a particular thickness. Preferably, the thickness is the desired width of a finished meat strip, such as bacon, which is approximately 1 inch. The slab press device 24, however, may be configured to press the slab to any predetermined thickness, depending on the type of meat or the size of the slab that is being compressed. Since the slabs normally are of the full width of the cavity 22 and thicker than the desired finished thickness (here 1 inch), the slabs will be elongated toward the open ends of the cavity, as described above, to thereby increase the length of slabs for slicing. The pressing pressure for causing this elongation had shaping of the slab is very substantial and, for example, approximately 70 psi on the surface of the slab (a total force of about 22,000 lbs.) has been successfully tested.

The press station 20 further includes a ram device 30. The ram device 30 includes an extendable ram face 32 connected to a ram cylinder 34. Once the slab has been pressed in the cavity 22 by the flat platen 26, the flat platen remains in place to hold the slab at the desired thickness. The ram face 32 is sized to form a tight fit with the cavity while the flat platen 26 is in the pressed position. This prevents any of the slab from escaping from the cavity 22 around the ram face 32. Prior to the pressing of the slab, the ram face 32 is in the non-engaged position 33 shown in dotted lines. Once the flat platen 26 is in the pressed position, the ram cylinder 34 forces the ram face 32 into the cavity 22, the ram face engaging the compressed slab. Thus, the ram face 32 forces the slab out of the cavity 22 into a sleeve 50.

Turning now to the sleeve 50, as shown in FIGS. 7-9, the sleeve 50 is preferably rectangular having a top 52, a bottom 54 and two sides 56. The sleeve 50 is preferably made of a FDA approved polypropylene formulation but any other FDA approved plastic having a slick surface, adequate strength and heat resistance would be acceptable. The polypropylene sleeve is preferably because of its strength and it prevents the slab from sticking to the interior surface of the sleeve. If the slab were to stick to the interior of the sleeve, it would result in tearing of the slab. While stainless steel cages require the slab to be wrapped in a permeable film to prevent them from sticking to the cage, the slab can be directly placed into the polypropylene sleeve without any further step to prevent it from sticking.

The length of the sleeve 50 is sized to accommodate the pressed slab length without compressing the slab in the lengthwise direction. The cross section 58 of the sleeve 50 has a width equal to the width of the cavity 22 and a height equal to the thickness of the pressed slabs. The top 52 and bottom 54 have a plurality of apertures 60 arranged in a pattern. The apertures 60 are preferably square, however, the apertures may be any other shape, such as a rectangle or circle. Further, the sides 56 of the sleeve may also be provided with a plurality of apertures 60 arranged in a pattern.

Prior to pressing the slab, the sleeve 50 is placed in the stripper plate press 36 in the press station 20, as shown in FIGS. 4 and 5. The stripper plate press 36 comprises an upper stripper plate 38 connected to an upper stripper plate hydraulic cylinder 40, a lower stripper plate 42 and air cylinders 44. The upper stripper plate 38 includes a sleeve closure plate 39 and protrusions 46, as shown in FIG. 6. The protrusions 46 are configured to match the shape of the apertures 60 and are arranged on the interior surface of the stripper plate 38 in a regular pattern matching the pattern of the apertures 60 in sleeve 50. The closure plate 39 extends normally downward from stripper plate 38, such that when the stripper plate 38 is in the pressed position 48, shown by dotted lines, the closure plate 39 closes the end of the sleeve 50 opposite the end open to the rectangular cavity 22. Similarly, lower stripper plate 42 also includes protrusions 46 along its interior, upper surface. The protrusions are configured to match the apertures 60 and their pattern in the bottom 54 of sleeve 50. The upper stripper plate hydraulic cylinder 40 pushes the upper stripper plate 38 into a position against the sleeve 50. This forces the sleeve 50 down onto lower stripper plate 42, such that the protrusions 46 fill the apertures 60 on the upper surface 52 and lower surface 54 of the sleeve 50. Thus, the stripper plates provide a smooth interior surface in the sleeve 50, as shown in FIG. 9.

When using a sleeve 50 with apertures 60 on the sides 56, side stripper plates may also be added to the stripper plate press 36. The side stripper plates would also have protrusions 46 to fill in the apertures 60, so that all of the interior surfaces of the sleeve are smooth.

The press station 20, further includes an inline scale (not shown) and a computer (not shown) connected to the inline scale and the ram device 30. Once the slab has been placed in the cavity 22, the inline scale weighs the slab. The computer then calculates the density of the slab and determines the precise amount of force to supply to the ram device 30, such that the slab is inserted into the sleeve 50 with the minimum amount of lengthwise compression. This can also be controlled by sensing and regulating the cylinder pressure.

Once the slab has been inserted into the sleeve 50, the upper stripper plate 38 retracts from the sleeve 50. The slab filled sleeve 50 is then lifted off of the lower stripper plate 42 by two small air cylinders 44. The slab-filled sleeve 50 is then transported from the press station 20 to a conventional oven or smokehouse 70. The oven/smokehouse cooks the slab to a temperature of approximately 128° F. Once cooked or smoked, the slab-filled sleeve is placed in a conventional blast-chiller 80 to be chilled to a desired temperature. Preferably, the blast chiller 80 chills the slab to a crust frozen condition and a temperature of approximately 22° F., or at least below 32° F.

The slab-filled sleeve, after cooking and chilling is transported to a slab removal device 90, as shown in FIG. 10. The slab removal device 90 includes a ram device 92 and a stripper plate press 100. The ram device 92 consists of a hydraulic cylinder 94 and a ram face 96 connected to the hydraulic cylinder. The ram face 96 is sized to form a tight fit with the cross section of the open end of the sleeve 50 formed by the top 52, bottom 54 and side walls 56 to prevent any of the slab from escaping past the ram face 96. The stripper plate press 100 consists of an upper stripper plate 102 connected to an upper stripper plate hydraulic cylinder 104, a lower stripper plate 103 and two air cylinders 106. The upper and lower stripper plates, 102 and 103, each have a pattern of protrusions similar to protrusions 46 to match the pattern of apertures 60 on the sleeve 50. The upper stripper plate cylinder 104 pushes the upper stripper plate 102 against the sleeve 50. This forces the sleeve 50 down onto the lower stripper plate 103 so that the protrusions 46 on the upper and lower stripper plates, 102 and 103, fill the apertures 60 on the sleeve 50 to provide a smooth interior surface. While the sleeve is being placed in the stripper plate press, the ram face 96 is in its initial retracted position 97. Once the stripper plates are in place against the sleeve 50, the ram hydraulic cylinder 94 forces the ram face 96 against the slab, forcing the slab out of the other open end of the sleeve 50.

The shaped slabs are then transported to a conventional spiral freezer 110 where the slabs are chilled to the appropriate temperature. The spiral freezer provides a temperature of approximately 18° F. to 27° F. for slicing the slab.

An exemplary method of processing pork bellies into bacon strips in accordance with the present invention and its features will now be described. Referring to FIG. 1, the pork bellies are loaded into the massager 10. The pork bellies may be injected with a pickle solution prior to loading the bellies into the massager 10. Alternately, the pickle solution may be infused into the bellies during the massaging process. The bellies are preferably massaged at a temperature above freezing of approximately 34° F. to 38° F., and in a vacuum. The bellies may either be fresh or defrosted. This process, aside from the normal benefits incurred by massaging the bellies, also serves to make the bellies pliable and conditioned for pressing at a temperature above freezing. The massaging process also activates proteins, which serve as the glue to knit together splits, rips or tears in the belly that may exist and/or occur during the pressing process. The bellies are massaged in a batch with a preferable batch size of approximately 10,000 lbs. But the batch size may be as large as 22,000 lbs.

After the bellies have been massaged in the massager 10, the bellies are unloaded from the massager 10 and transported, via a conveyor system 11 to the press station 20. The conveyor 11 is sized to accommodate the entire batch of bellies. Once at the press station 20, a belly is manually laid into the cavity 22, as shown in FIGS. 2 and 3. The bellies are of varying dimensions and proportions (typically for pork bellies from 8 inches to 14 inches wide, 18 inches to 28 inches long and ¾ inches to 2½ inches thick) with somewhat irregular shapes that conventional processes might require trimming to a nearly rectangular shape but no trimming is necessary with the method and apparatus of the present invention. The temperature of the bellies at the press station is still above freezing, at approximately 34° F. to 38° F., and the bellies are sufficiently pliable to be forced into the cavity 22. The hydraulic cylinder 28 then forces the flat platen 26 downward into the cavity to press the belly to a predetermined thickness less than the starting thickness of the belly. Preferably the predetermined thickness is 1 inch, however, depending on the type and thickness of the meat slabs that are being pressed and the desired size of the end product, the predetermined thickness can be any desired thickness. For example, when the slabs being processed are only about 1 inch thick, then they will be pressed to less than 1 inch thickness to achieve the desired reshaping and elongation to form rectangular, pressed bellies.

The cavity 22 is preferably rectangular, so that as the belly is pressed, it has a substantially rectangular shape with straight, parallel sides. However, because both ends of the cavity 22 are open, as the platen 26 presses the belly, the belly will expand or stretch at least 4 inches and up to 12 inches or more. The tight seal between the flat platen 26 and the cavity 22 also facilitates this expansion or stretching of the belly, because the belly cannot pass around the flat platen 26 as it is pressed. Thus, the rectangular cavity 22 and the flat platen 26 provide a pressed belly with a rectangular cross-section.

While the belly may be pressed only once, it is preferable to press the belly a second time. The prior art devices press bellies that are crust frozen and tempered to a temperature of 18° F. to 27° F. Pressing the bellies while frozen permit them to retain their shape. The process of the present invention, however, presses the bellies while at a temperature above freezing, preferably 34° F. to 38° F. Because the bellies are pressed at a temperature above freezing, they will rebound toward their previous shape after being pressed the first time. Pressing the bellies a second time substantially reduces the amount of rebounding the bellies undergo when removed from the press.

One of the advantages of pressing the belly at a temperature above freezing is that there is a lower likelihood of the connective tissues in the belly shearing during the pressing process. While it is desirable to prevent the rebounding of the belly, a small amount of rebounding is desirable so that as the belly is placed in the sleeve 50, it rebounds slightly to press against the inner surfaces of the sleeve 50. This rebounding prevents the belly from sliding out of the sleeve 50.

The sleeve 50 is open at each end, with an open end placed immediately adjacent to the open end of the cavity 22. Once the sleeve 50 is in place, the stripper plate press 36 presses the upper stripper plate 38 and lower stripper plate 42 against the surface of the sleeve 50. The protrusions 46 on the upper and lower stripper plates, 38 and 42, fit into and fill the apertures 60 on the upper sleeve surface 52 and the lower sleeve surface 54 providing a smooth interior surface for the sleeve 50, as shown in FIG. 9.

Once the sleeve 50 and the stripper plates 38 and 42 are in place, the ram device 30 then pushes the belly out of the cavity 22, while the flat platen 26 is in the pressed position, into the sleeve 50. The in-line scale weighs the belly prior to pressing. A computer, connected to both the scale and the ram device 30, calculates the density of the belly, based on its weight, and adjusts the hydraulic pressure exerted by the ram device 30 on the belly. The ram face 30 starting in position 33 is pushed by hydraulic cylinder 34 so that the ram face 32 engages with the end of the belly in the cavity 22. By controlling the pressure exerted on the belly while it is inserted into the sleeve 50, the minimum amount of pressure is exerted on the belly to insure that the belly fills the entire sleeve without compressing the belly lengthwise. Additionally, this minimum amount of pressure is sufficient to close any tears or voids in the belly, which allows the tears or voids to be repaired by the proteins released during the massaging process, and to square the ends of the belly at the closure plate 39 and ram face 32.

After the belly has been inserted into the sleeve 50, the ram face 32 and flat platen 26 are retracted to their initial positions, as shown in FIG. 2. Further, the upper stripper plate 38 is also retracted to its initial position. Preferably, two small air cylinders 44 then actuate to separate the sleeve 50 from the lower stripper plate 42, releasing the sleeve 50. The belly-filled sleeve is then taken from the press station 20 and placed on a tree (not shown).

Once the belly-filled sleeve 50 has been placed on the tree, the tree is moved into the smokehouse/oven 70 so that the belly can be cooked. Preferably the belly is cooked to approximately 128° F. The oven 70 may be a smokehouse so that the smoke flavoring may be added to the bellies. Alternatively, the belly may be cured with liquid smoke added to the brine to provide the belly with a smoked flavor. The apertures 60 in the sleeve 50 allow the smoke, and heated air to reach the surface of the belly for cooking and flavoring. The proteins, which were activated by the massaging process, serve as a glue to knit together any splits, rips or tears that occurred in the belly during the pressing. These proteins coagulate during the cooking process and glue any of the rips, tears or splits together.

After cooking, the belly-filled sleeve 50, is removed from the oven 70 and is transported to the blast chiller 80. The belly-filled sleeve is then blast chilled to a crust frozen condition at a chosen temperature, preferably approximately 22° F. but up to about 32° F.

The chilled belly, once it reaches the desired temperature, is removed from the blast chiller 80 and transported to the belly removal device 90, as shown in FIG. 10. The belly-filled sleeve 50 is placed into the stripper plate press 100 and onto the lower stripper plate 103. The upper stripper plate 102 is then pressed against the upper surface 52 of the sleeve 50. This forces the sleeve 50 onto the lower stripper plate 103, such that the protrusions on the stripper plates fit into and fill the apertures 60 in the sleeve 50. The stripper plates, thus, provide a smooth interior surface for the belly to slide on as they are pushed out of the sleeve. The ram face 96 is in its initial position 97 as the sleeve 50 is loaded into the stripper plate press 100. Once the sleeve 50 is in position, the hydraulic cylinder 94 forces the ram face 96 toward the sleeve 50, and engages with the belly. The ram face 96 continues to push against the belly until it is completely removed from the sleeve 50. Because of the tight seal between the ram face 96 and the sleeve 50, the belly is removed from the sleeve 50 without permitting any of the belly to escape past the ram face 96. The smooth inner surface formed by the protrusions 46 filling the apertures and compressing any of the belly surface that may have expanded into the apertures 60 allows the cooked belly to be ejected with minimal compressive force and without damage.

After the belly is removed for the sleeve 50 in the belly removal device 90, the belly is transported, preferably via conveyor to the spiral freezer 110. The belly remains in the freezer until it reaches equilibrium, such that its core temperature reaches between 18° F. and 27° F. The belly is then sliced to a particular thickness. The slicing yields resulting from this process approach 100% of the belly.

While the above process has been described in conjunction with processing a single belly, the process can [process multiple bellies in a parallel processing line, as shown in FIGS. 1 and 3. The press station 20 will preferably contain more than one cavity 22, such that more than one belly may be processed at the same time. Further, if desired, two or more smaller bellies or other meat pieces may be placed in the same cavity 22 for pressing into a single rectangular mass for slicing.

While embodiments and applications of this invention have been shown and described, it would be apparent to those skilled in the art that other modifications are possible without departing from the inventive concepts herein. The invention, therefore, is not to be restricted except in the spirit of the claims that follow.

What is claimed is:

1. A method of processing a meat slab, comprising the steps of:

massaging the slab;

placing the massaged slab in a cavity having two parallel sidewalls and a base extending between the two sidewalls, the cavity having room at least at a first end for expansion of the slab parallel to the sidewalls and the base;

pressing the placed slab in the cavity against the base to a predetermined thickness including advancing a platen toward the base with the slab unfrozen;

allowing the slab to expand in the direction of the first end during pressing;

providing a sleeve for receiving the pressed slab from the first end;

discharging the pressed slab from the cavity by pushing the pressed slab parallel to the sidewalls, the base and the platen into the sleeve through the first end of the cavity with the slab pressed by the platen to the predetermined thickness.

2. The method of claim 1, placing the massaged slab further being in the cavity having room at a second end for expansion of the slab parallel to the sidewalls.

3. The method of claim 1, wherein the slab is massaged at a temperature of approximately 34° F.

4. The method of claim 1, wherein the neat slab is a pork belly.

5. The method of claim 1, wherein the slab is injected with a pickle solution prior to massaging.

6. The method of claim 1, further comprising the step of infusing the slab with a pickle solution while the slab is massaged.

7. The method of claim 1, wherein the slab is pressed at a temperature of approximately 34° F. to 38° F.

8. The method of claim 1 further comprising the step of cooking the meat slab in the sleeve.

9. The method or claim 1 further comprising the steps of chilling the slab to at least a crust frozen condition; and removing the chilled slab from the sleeve.

10. The method of claim 1, further comprising the step of slicing the slab into meat strips, wherein the slab is sliced across the width of the slab.

11. A method of processing a meat slab, comprising the steps of:

massaging the slab;

placing the massaged slab in a cavity, the cavity having room at least at a first end for expansion of the slab;

pressing the slab at a temperature above freezing in the cavity to a predetermined thickness, wherein the slab is pressed with a flat platen;

providing a sleeve open at least at a first end for receiving the pressed slab;

discharging the pressed slab from the cavity into the sleeve through the first open end of the cavity while the slab is being pressed by the flat platen;

chilling the slab to at least a crust frozen condition; and removing the chilled slab from the sleeve.

12. The method of claim 11, further comprising the steps of:

releasing the flat platen after pressing the slab;

pressing the slab with the flat platen a second time in the cavity;

maintaining the flat platen in the pressed position concurrently with discharging the pressed slab.

13. The method of claim 12, wherein the cavity is rectangular having a width equal to the desired length of a processed meat strip.

14. The method of claim 13, wherein the rectangular cavity has a length longer than the slab placed in the rectangular cavity.

15. The method of claim 14, wherein the flat platen presses the slab, in a direction perpendicular to the width and length of the rectangular cavity, to a thickness equal to the desired width of the processed meat strip.

16. The method of claim 15, wherein the flat platen is rectangular and is sized to prevent passage of the slab past the flat platen during the pressing of the slab.

17. The method of claim 15, wherein the sleeve is rectangular, the cross-section of the sleeve having a width equal to the cavity width and a height equal to the thickness of the pressed slab.

18. The method of claim 17, wherein the length of the sleeve is sized for receiving the length of the pressed slab without compressing the slab lengthwise.

19. The method of claim 18, wherein the slab is discharged into the sleeve with a force adequate to minimize voids and square the ends of the slab without causing lengthwise compression of the slab.

20. The method of claim 14, wherein the pressed slab expands in length by at least 4 inches and up to approximately 16 inches.

21. The method of claim 14, wherein the pressed slab expands in length by at least 6 inches and up to approximately 16 inches.

22. A method of processing a meat slab, comprising the steps of:

massaging the slab;

placing the massaged slab in a cavity, the cavity having at least a first open end;

pressing the slab in the cavity to a predetermined thickness;

providing a sleeve with at least a first open end for receiving the pressed slab, wherein the sleeve comprises an upper surface and lower surface, the upper and lower surfaces having a pattern of apertures;

discharging the pressed slab from the cavity into the sleeve through the first open end of the cavity while the stab is being pressed.

23. The method of claim 22, further comprising the steps of: covering the upper and lower surfaces of the sleeve with an upper and lower stripper plate before discharging the slab into the sleeve.

24. The method of claim 23, wherein the upper stripper plate further comprise an end closure plate, the end closure plate closing a second open end of the sleeve when the upper stripper plate covers the upper surface of the sleeve.

25. The method of claim 23, wherein the upper and lower stripper plates have a pattern of protrusions fitting into and filling the pattern of apertures along the surface of the upper and lower rectangular surfaces of the sleeve, providing a smooth interior surface in the sleeve for receiving the slab.

26. The method of claim 25, wherein a ram device discharges the slab of the cavity and into the sleeve.

27. The method of claim 25, further comprising the step of removing the upper and lower stripper plates from the sleeve after the slab is discharged into the sleeve.

28. The method of claim 27 further comprising the step of removing the slab from the sleeve;

covering the upper and lower surfaces of the sleeve with upper and lower stripper plates before removing the slab from the sleeve.

29. The method of claim 28, wherein a ram device comprising a ram face connected to a hydraulic cylinder removes the slab from the sleeve.

30. A method of processing meat slabs in preparation for cooking and slicing into strips, comprising the steps of:

placing at least one of the slabs uncooked and above freezing in a rectangular cavity of a width equal to the desired length of the sliced strips and of a length longer than the at least one slab placed in the cavity;

pressing the at least one slab in the rectangular cavity with a flat platen in a direction perpendicular to said width and length to a thickness of the at least one slab equal to the desired width of the sliced strips;

providing a rectangular sleeve with an open end having a width equal to the cavity width and a height equal to the thickness of the pressed at least one slab, said rectangular sleeve having a length for receiving the length of the pressed at least one slab; and discharging the at least one pressed slab from the rectangular cavity by pushing the pressed slab in the direction of the cavity length into the rectangular sleeve through the open end while maintaining the flat platen in the same position against the at least one slab as when the pressing was completed;

chilling the at least one slab to at least a crust frozen condition; and removing the slab chilled at least at a crust frozen condition from the sleeve.

31. The method of claim 30, further comprising the step of:
pressing the at least one slab lengthwise into the rectangular sleeve with a force adequate to minimize voids and to square the ends of the at least one slab without causing lengthwise compression of the at least one slab to thereby complete the rectangular shape of the formed at least one slab.

32. A method of processing meat slabs in preparation for cooking and slicing into strips, comprising the steps of:
placing the slabs having a temperature above freezing in a cavity of a width equal to the desired length of the sliced strips and of a length longer than the slabs placed in the cavity;

pressing the slabs in the rectangular cavity with a flat platen in a direction perpendicular to said width and length to a thickness of the slabs equal to the desired width of the sliced strips;

releasing the pressing of the slabs by the platen after pressing the thickness of the slabs equal to the desired width of the sliced strips and then pressing the slabs again to that thickness;

providing a rectangular sleeve with an open end having a width equal to the cavity width and a height equal to the thickness of the pressed slabs, said rectangular sleeve having a length for receiving the length of the pressed slabs;

discharging the pressed slabs from the rectangular cavity in the direction of the cavity length into the rectangular sleeve through the open end while maintaining the flat platen in the same position as when the pressing was completed;

cooking the meat slab in the sleeve;

chilling the cooked slab to at least a crust frozen condition; and removing the chilled slab from the sleeve.

33. A method of processing pork bellies for slicing into bacon strips, comprising the steps of:
massaging the bellies at a temperature below room temperature and above freezing for conditioning the bellies;

placing the bellies in a rectangular cavity of a width equal to the desired length of the processed bacon strips and of a length longer than the bellies placed in the cavity, said cavity being open at both ends in the direction of the length;

pressing the bellies in the rectangular cavity with a flat platen in a direction perpendicular to said width and length to a thickness of the bellies equal to the desired width of the processed bacon strips, said flat platen having the width and length of the rectangular cavity for inhibiting the passage of the bellies past the platen during pressing but causing the bellies to expand in the direction of the length of the rectangular cavity;

releasing the pressing of the bellies by the platen by reversing the movement in the perpendicular direction and then pressing the bellies again in the perpendicular direction with a flat platen;

providing a rectangular sleeve with an open end having a width equal to the cavity width and a sleeve height equal to the thickness of the pressed bellies forming the bacon strip width, said rectangular sleeve having a length for receiving the length of the pressed bellies;

providing an upper stripper plate and a lower stripper plate covering the length and width of the upper and lower rectangular surfaces, respectively, of the rectangular sleeve, said stripper plates each having a pattern of protrusions fitting into and filling a like pattern of apertures in the upper and lower rectangular surfaces of the sleeve and forming a smooth interior surface in the sleeve for receiving the bellies from the rectangular cavity;

discharging the pressed bellies from the rectangular cavity in the direction of the cavity length into the rectangular sleeve while maintaining the flat platen in the same position as when the pressing was completed for establishing the bacon strip width to thereby maintain that width;

pressing the bellies lengthwise into the rectangular sleeve with a force adequate to minimize voids and square the ends of the bellies without causing lengthwise compression of the bellies to thereby complete the rectangular shape of the formed bellies;

removing the stripper plates from the rectangular sleeve and placing the sleeve with the bellies retained therein into a cooking environment until cooked;

removing the bellies-filled sleeve from the cooking environment and blast chilling the bellies to a predetermined temperature above freezing while retaining the bellies in the sleeve;

covering the upper and lower rectangular surfaces of the sleeve with upper and lower stripper plates, respectively, each having a pattern of protrusions fitting into and filling the like pattern of apertures in the upper and lower rectangular surfaces of the sleeve and forming a smooth interior surface in the sleeve;

discharging the shaped and cooked bellies from the stripper plate covered sleeve through an open end of the sleeve;

chilling the shaped and cooked bellies to a predetermined temperature while maintaining the rectangular shape.

34. The method of claim 33 further comprising the step of slicing the bellies across the width and through the height of the rectangular shape to a desired thickness to produce the bacon strips.

35. A method of processing a meat slab in preparation for slicing into strips, comprising the steps of:
placing the slab at above freezing in a cavity of a width equal to the desired length of the sliced strips, of a length, at least at a first end, for full expansion of the meat slab along the length and with an open top;

pressing the slab at above freezing into the cavity through the open top in a direction perpendicular to the cavity width and length to a thickness equal to the desired width of the sliced strips and without compression of the slab along the length of the cavity;

locating a sleeve with an open end at the first end of the cavity, the sleeve having a width equal to the cavity width and a height equal to the thickness of the pressed slab, the sleeve having a length for receiving the length of the pressed slab; and discharging the pressed slab at above freezing from the cavity by pushing the pressed slab in the direction of the catty length through the first end of the cavity into the sleeve through the open end of the sleeve, including keeping the slab at the thickness equal to the desired width of the sliced strips.

36. The method of claim 35, discharging the slab into the sleeve being with a force adequate to minimize voids and to square the ends of the slab without causing lengthwise compression of the slab.

37. The method of claim 35 further comprising the steps of:
chilling the slab in the sleeve to at least a crust frozen condition; and
removing the chilled slab from the sleeve.

38. The method of claim 35 comprising the steps of:
massaging the slab before placing the slab at above freezing in the cavity.

39. The method of claim 35 further comprising the step of:
imparting a smoke flavor to the slab while the slab is massaged.

40. The method of claim 35 further comprising the step of:
constraining the width of the massaged slab in the cavity using two parallel sidewalls in the cavity.

41. The method of claim 35, pressing the slab including allowing the slab to expand fully unconstrained in the direction of the length of the cavity.

* * * * *

UNITED STATES PATENT AND TRADEMARK OFFICE
CERTIFICATE OF CORRECTION

PATENT NO. : 7,501,140 B2  Page 1 of 1
APPLICATION NO. : 10/294946
DATED : March 10, 2009
INVENTOR(S) : Bruce M. Gould et al.

It is certified that error appears in the above-identified patent and that said Letters Patent is hereby corrected as shown below:

In Claim 20, line 3 (Col. 10, l. 14), delete "16" and insert -- 12 -- therefore.

In Claim 21, line 3 (Col. 10, l. 17), delete "16" and insert -- 12 -- therefore.

In Claim 24, line 2 (Col. 10, l. 36), delete "comprise" and insert -- comprises -- therefore.

Signed and Sealed this

Ninth Day of June, 2009

JOHN DOLL
*Acting Director of the United States Patent and Trademark Office*